(12) United States Patent
Iizuka (10) Patent No.: US 8,911,318 B2
(45) Date of Patent: Dec. 16, 2014

(54) PINION LUBRICATION STRUCTURE OF PLANETARY GEAR MECHANISM

(71) Applicant: Honda Motor Co., Ltd., Tokyo (JP)

(72) Inventor: Kohei Iizuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/220,134

(22) Filed: Mar. 20, 2014

(65) Prior Publication Data
US 2014/0287864 A1 Sep. 25, 2014

(30) Foreign Application Priority Data
Mar. 21, 2013 (JP) .................................. 2013-058045

(51) Int. Cl.
*F16H 57/04* (2010.01)
(52) U.S. Cl.
CPC .................................... *F16H 57/043* (2013.01)
USPC .......................................... 475/159; 475/331
(58) Field of Classification Search
USPC .................................. 475/159, 160, 331, 348
See application file for complete search history.

(56) References Cited

U.S. PATENT DOCUMENTS

| 1,624,756 A * | 4/1927 | Nabstedt ........................ 475/159 |
| 7,097,582 B2 * | 8/2006 | Bauknecht et al. ........... 475/159 |
| 2007/0010365 A1 * | 1/2007 | Schmitt ......................... 475/159 |
| 2009/0247348 A1 * | 10/2009 | Haupt et al. .................. 475/159 |
| 2012/0157256 A1 * | 6/2012 | Takeuchi et al. .............. 475/159 |
| 2012/0252627 A1 * | 10/2012 | Koyama et al. ............... 475/331 |

FOREIGN PATENT DOCUMENTS

| JP | 4356382 B2 | 3/2005 |
| JP | 2010-065741 | 3/2010 |

* cited by examiner

*Primary Examiner* — Justin Holmes
(74) *Attorney, Agent, or Firm* — Mori & Ward, LLP (57) ABSTRACT

A pinion lubrication structure of a planetary gear mechanism includes a hollow portion, an annular oil catcher, an oil gallery, and an aperture. The annular oil catcher is supported by a carrier to collect oil to flow into the hollow portion. The oil is supplied outward in a radial direction from a central portion of the planetary gear mechanism. The oil is supplied to an inner peripheral surface of a pinion through the oil gallery. The oil gallery extends from an inside of the hollow portion through a pinion shaft in the radial direction. The aperture is provided at an axial end of the pinion shaft to be connected to the hollow portion. A distance from an axis to an outer end of the aperture in the radial direction is smaller than a distance from the axis to an outer end of the hollow portion in the radial direction.

20 Claims, 5 Drawing Sheets

PINION LUBRICATION STRUCTURE OF PLANETARY GEAR MECHANISM

CROSS-REFERENCE TO RELATED APPLICATIONS

The present application claims priority under 35 U.S.C. §119 to Japanese Patent Application No. 2013-058045, filed Mar. 21, 2013, entitled "Pinion Lubrication Structure." The contents of this application are incorporated herein by reference in their entirety.

BACKGROUND

1. Field

The present disclosure relates to a pinion lubrication structure of a planetary gear mechanism.

2. Description of the Related Art

In a planetary gear mechanism, a pinion is rotatably supported by a carrier through a pinion shaft, and an inner peripheral surface of the pinion is lubricated with oil that is supplied from a hollow portion in the pinion shaft through an oil gallery. A lubrication structure is known in which oil is supplied outward in the radial direction from a central portion of a planetary gear mechanism in the radial direction by a centrifugal force, the oil is caught by an oil catcher (an annular receiver or a guide member), and the oil is supplied to a hollow portion in a pinion shaft (see Japanese Patent No. 4356382 and Japanese Unexamined Patent Application Publication No. 2010-65741).

SUMMARY

According to one aspect of the present invention, a pinion lubrication structure of a planetary gear mechanism includes a hollow portion, an annular oil catcher, an oil gallery, and an aperture. The planetary gear mechanism includes a pinion, a pinion shaft that rotatably supports the pinion, and a carrier that rotates around an axis. The hollow portion is provided in the pinion shaft. The annular oil catcher is supported by the carrier to collect oil so that the oil flows into the hollow portion. The oil is supplied outward in a radial direction from a central portion of the planetary gear mechanism. The oil is supplied to an inner peripheral surface of the pinion through the oil gallery. The oil gallery extends from an inside of the hollow portion through the pinion shaft in the radial direction. The aperture is provided at an axial end of the pinion shaft to be connected to the hollow portion. A distance from the axis to an outer end of the aperture in the radial direction is smaller than a distance from the axis to an outer end of the hollow portion in the radial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
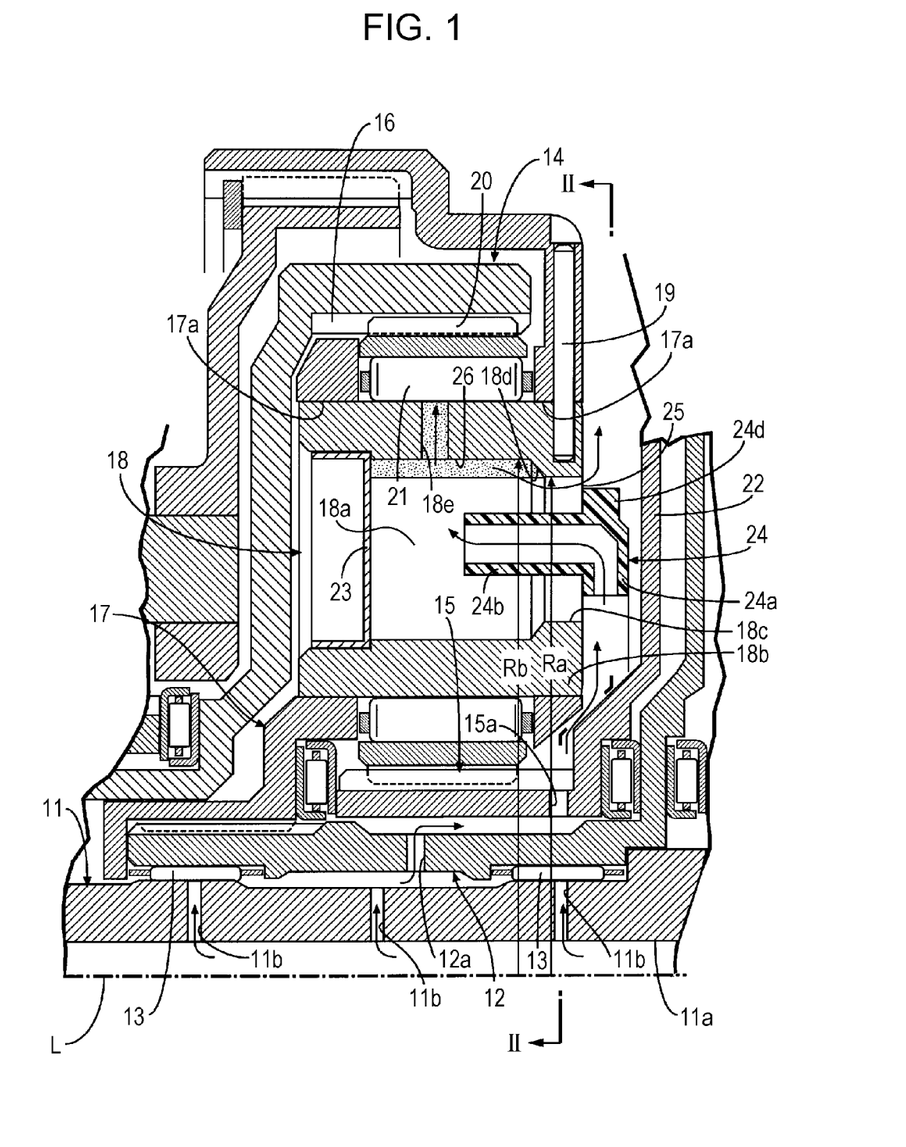
FIG. 1 is a longitudinal sectional view of a planetary gear mechanism according to a first embodiment.
Figure 2:
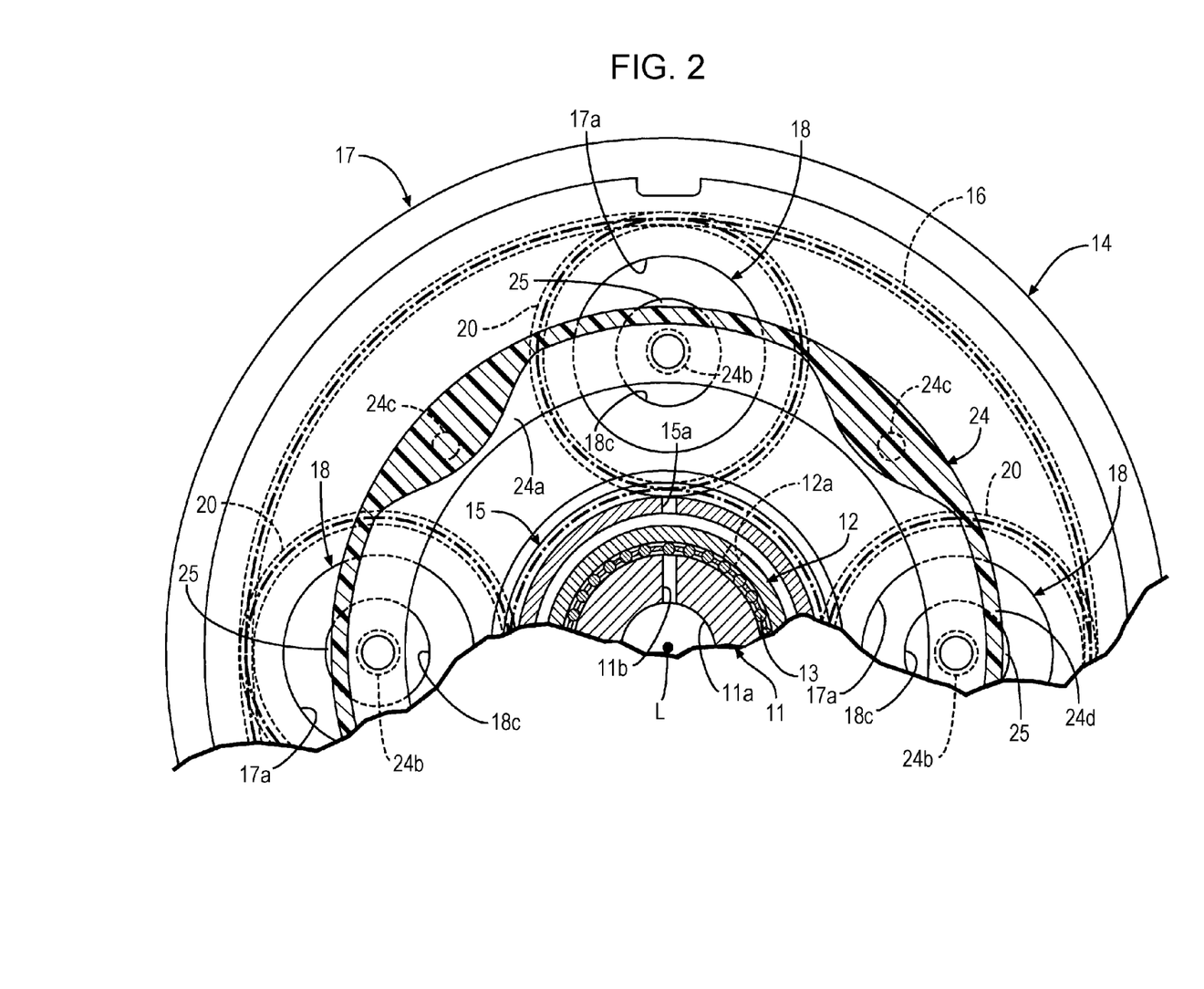
FIG. 2 is a sectional view of FIG. 1 taken along line II-II.
Figure 3:
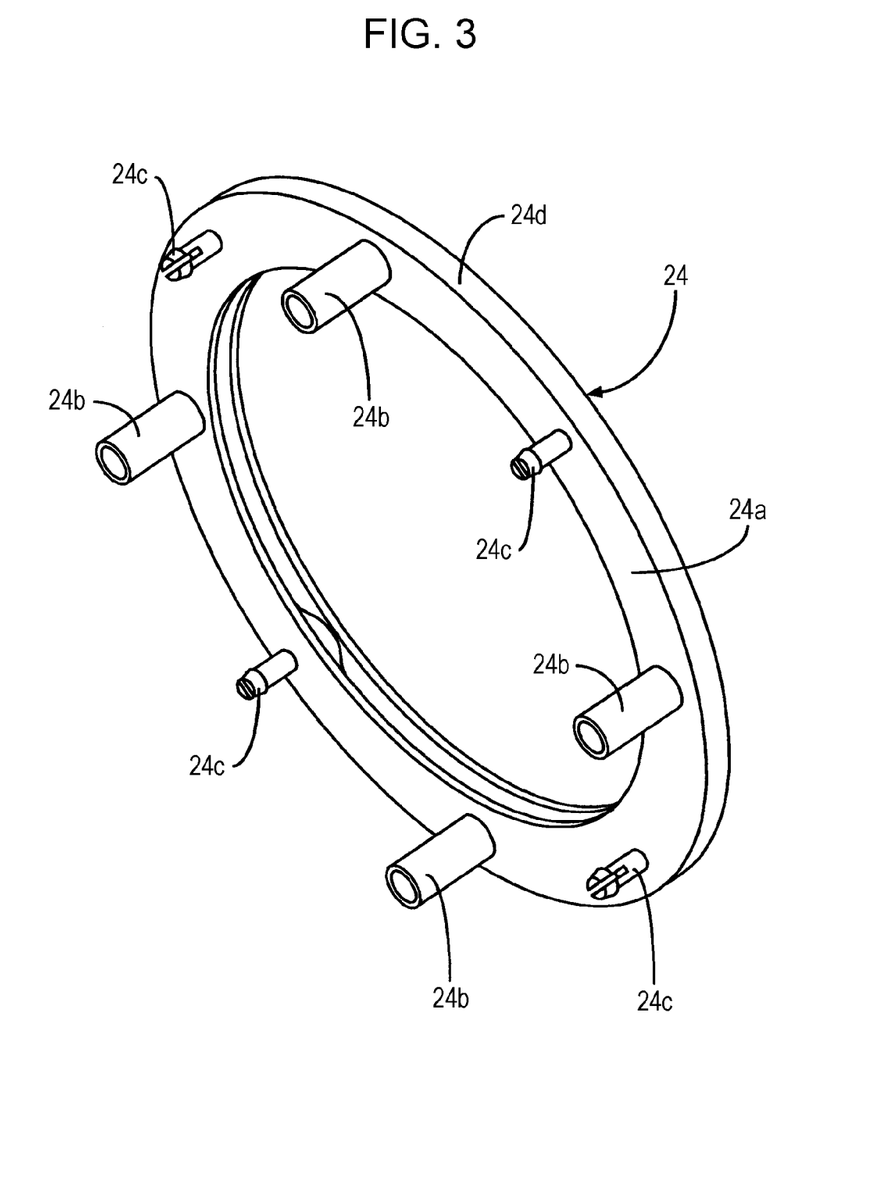
FIG. 3 is a perspective view of an oil catcher according to a first embodiment.

Referring to FIGS. 1 to 3, a first embodiment of the present disclosure will be described.

As illustrated in FIG. 1, a sleeve 12 is rotatably supported on an outer periphery of an input shaft 11 of an automobile transmission through needle bearings 13. A single-pinion planetary gear mechanism 14 is disposed on the outer periphery of the sleeve 12. The planetary gear mechanism 14 includes three rotation elements, which are a sun gear 15 located in an inner portion thereof in the radial direction, a ring gear 16 located in an outer portion thereof in the radial direction, and a carrier 17, a part of which is interposed between the sun gear 15 and the ring gear 16 in the radial direction. The carrier 17 has four pinion-shaft-support holes 17a, which are arranged at a regular pitch along the circumference of a circle centered on the axis L of the input shaft 11. A pinion shaft 18 is fitted into each of the pinion-shaft-support holes 17a in the direction of the axis L, and the pinion shaft 18 is fixed to the carrier 17 with a pin 19 that is pressed into the carrier 17. A pinion 20 is rotatably supported on the outer periphery of each of the pinion shafts 18 through a needle bearing 21. The pinion 20 simultaneously meshes with the sun gear 15 located inside in the radial direction and the ring gear 16 located outside in the radial direction.

An oil passage 11a is formed in the input shaft 11 so as to extend in the direction of the axis L. A plurality of oil galleries 11b extend from the oil passage 11a through the input shaft 11 outward in the radial direction. An oil gallery 12a extends through the sleeve 12, which covers one of the oil galleries 11b of the input shaft 11, outward in the radial direction. A clutch drum 22 of a hydraulic clutch (not shown) extends from a right end (in FIG. 1) of the sun gear 15 outward in the radial direction. At a position near an inner end of the clutch drum 22 in the radial direction, an oil gallery 15a extends through the sun gear 15 outward in the radial direction.

Each of the pinion shafts 18 has a cylindrical shape, and a hollow portion 18a having a circular cross section is formed in the pinion shaft 18 so as to extend in the direction of the axis L. An opening at the left end (in FIG. 1) of the hollow portion 18a is closed by pressing a plug 23 thereinto. An opening 18c having a circular cross section extends through an end wall 18b at the right end (in FIG. 1) of the pinion shaft 18 so as to be coaxial with the hollow portion 18a. The inside diameter of the hollow portion 18a is larger than the inside diameter of the opening 18c, and a stepped portion 18d is formed between the hollow portion 18a and the opening 18c. As a result, in an outer end portion of the pinion shaft 18 in the radial direction as seen from the axis L of the input shaft 11, the distance Ra from the axis L to the inner peripheral surface of the opening 18c is smaller than the distance Rb from the axis L to the inner peripheral surface of the hollow portion 18a (see FIG. 1).

The pinion shaft 18 has an oil gallery 18e extending therethrough in the radial direction. Through the oil gallery 18e, the hollow portion 18a is connected to the needle bearing 21, which supports the pinion 20. The pinion shaft 18 may have a plurality of oil galleries 18e, at least one of which is disposed at an outer end of the pinion shaft 18 as seen from the axis L of the input shaft 11.

As illustrated in FIGS. 1 to 3, an oil catcher 24 is attached to a right side surface (in FIG. 1) of the carrier 17. The oil catcher 24 guides oil, which is supplied from the oil passage 11a of the input shaft 11, to the hollow portion 18a of the pinion shaft 18. The oil catcher 24 is a component that is integrally made from a synthetic resin. The oil catcher 24 includes an oil catching portion 24a, four oil guide portions 24b, and four engagement tabs 24c. The oil catching portion 24a has an annular shape and surrounds the axis L. The oil guide portions 24b are arranged on one side of the oil catching portion 24a at a 90° pitch and protrude in the direction of the axis L. The engagement tabs 24c are arranged on one side of the oil catching portion 24a at a 90° pitch and protrude in the direction of the axis L. The oil guide portions 24b and the engagement tabs 24c are alternately arranged at a 45° pitch.

The oil catching portion 24a of the oil catcher 24 has a U-shaped cross section that is open inward in the radial direction. The oil guide portion 24b, which has a tubular shape, is connected to an inner space of the oil catching portion 24a. The oil catcher 24 is fixed to the carrier 17 by pressing the four engagement tabs 24c into engagement holes (not shown) formed in a right-side surface (in FIG. 1) of the carrier 17. In this state, the four oil guide portions 24b of the oil catcher 24 loosely extend through the openings 18c of the four pinion shafts 18 and are inserted into the hollow portions 18a.

When the oil catcher 24 is attached to the carrier 17, an aperture 25 (see FIGS. 1 and 2) having a crescent shape is formed between each of the openings 18c of the pinion shafts 18 and a protrusion 24d on the outer periphery of the oil catcher 24. As a result, an oil reservoir 26 (see FIG. 1), which is embanked by the stepped portion 18d, is formed at a position in the hollow portion 18a of the pinion shaft 18 that is farthest from the axis L of the input shaft 11. The oil reservoir 26 is connected to the outside space through the aperture 25.

Next, an operation of the first embodiment having the above structure will be described.

Oil supplied from an oil pump (not shown) flows through the oil passage 11a and the oil galleries 11b of the input shaft 11 to the outside of the input shaft 11. A part of the oil lubricates the needle bearings 13 on the outer periphery of the input shaft 11. Another part of the oil passes through the oil gallery 12a of the sleeve 12 and the oil gallery 15a of the sun gear 15 and lubricates meshing portions of the sun gear 15 and the pinions 20, and the like. A part of the oil that has passed through the oil gallery 15a of the sun gear 15 flows outward in the radial direction through a space between the carrier 17 and the clutch drum 22 of the planetary gear mechanism 14. Then, the oil is sprinkled in the radial direction by a centrifugal force along the carrier 17 and the clutch drum 22, which rotate around the axis L. The oil is caught by the oil catching portion 24a of the oil catcher 24 having an opening there.

The oil caught by the oil catching portion 24a of the oil catcher 24 flows into the hollow portions 18a of the pinion shafts 18 through the oil guide portions 24b. In each of the hollow portions 18a, the oil is urged by a centrifugal force outward in the radial direction from the axis L, and thereby the oil is held in the oil reservoir 26, which is located at an outer end of the hollow portion 18a in the radial direction. The distance Ra from the axis L to the outer end of the aperture 25 (the opening 18c) of the pinion shaft 18 in the radial direction is smaller than the distance Rb from the axis L to the outer end of the oil reservoir 26 in the radial direction. Therefore, the stepped portion 18d, which is located between the aperture 25 and the oil reservoir 26, serves as an embankment, and a minimum necessary amount of oil is held in the oil reservoir 26.

Oil in the oil reservoir 26 passes through the oil gallery 18e, which extends through the pinion shaft 18, due to a centrifugal force. Therefore, the needle bearing 21, which supports the pinion 20 fitted thereonto, can be reliably lubricated with the oil. Surplus oil overflowing from the oil reservoir 26 flows over the stepped portion 18d and is discharged through the aperture 25 of the opening 18c to the outside of the pinion shaft 18. Then, the oil is sprinkled further outward by a centrifugal force and is used to lubricate the hydraulic clutch and the like.

If an excessively large amount of oil is held in the hollow portion 18a of the pinion shaft 18, a centrifugal force acting on the oil generates a large centrifugal hydraulic pressure, and therefore the following problems may occur: the plug 23 may become removed from the hollow portion 18a; the oil catcher 24 may become removed from the carrier 17; and the plug 23 or the oil catcher 24 that has been removed may contact a component of the planetary gear mechanism 14 that is rotating and become damaged. With the present embodiment, such problems can be avoided because a minimum necessary amount of oil is held in the oil reservoir 26 and therefore an excessive centrifugal hydraulic force is prevented from acting on the oil.

The aperture 25 is automatically formed by inserting the oil guide portion 24b of the oil catcher 24 into the opening 18c, which is formed at an axial end of the pinion shaft 18. Therefore, the manufacturing cost can be reduced because it is not necessary to perform particular mechanical machining when forming the aperture 25. Moreover, the protrusion 24d, which covers a part of the aperture 25, is formed on an outer peripheral portion of the oil catcher 24. Therefore, the opening area of the aperture 25 can be easily adjusted by only changing the dimension of the protrusion 24d in the radial direction.

Second Embodiment

Figure 4:
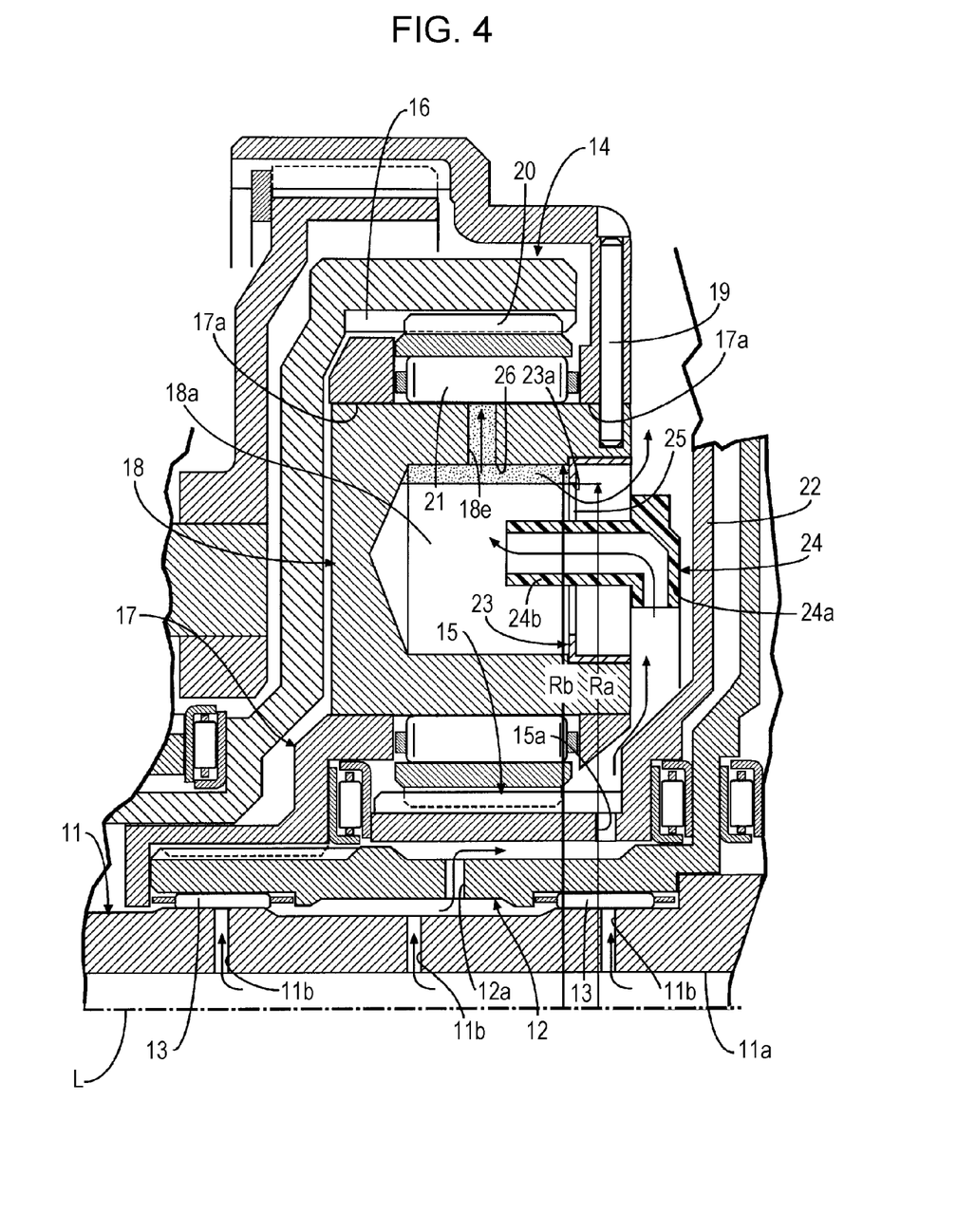
FIG. 4 is a longitudinal sectional view of a planetary gear mechanism according to a second embodiment.

Next, referring to FIG. 4, a second embodiment of the present disclosure will be described.

In the first embodiment, the hollow portion 18a extends through both end surfaces of the pinion shaft 18 in the direction of the axis L, and the opening on the left side (in FIG. 1) is closed with the plug 23. In the second embodiment, the hollow portion 18a of the pinion shaft 18 is a blind hole, and the plug 23 is pressed into an opening on the right side (in FIG. 4). An opening 23a is formed at the center of the plug 23, and the oil guide portion 24b of the oil catcher 24 is loosely fitted into the opening 23a at the center of the plug 23.

In the second embodiment, as seen from the axis L of the input shaft 11, the aperture 25 is formed between the outer end of the opening 23a of the plug 23 in the radial direction and the outer end of the oil guide portion 24b of the oil catcher 24 in the radial direction, and the oil reservoir 26 is formed in a part of the hollow portion 18a located further outward than the aperture 25 in the radial direction. The second embodiment has an advantage the same as that of the first embodiment.

Third Embodiment

Figure 5:
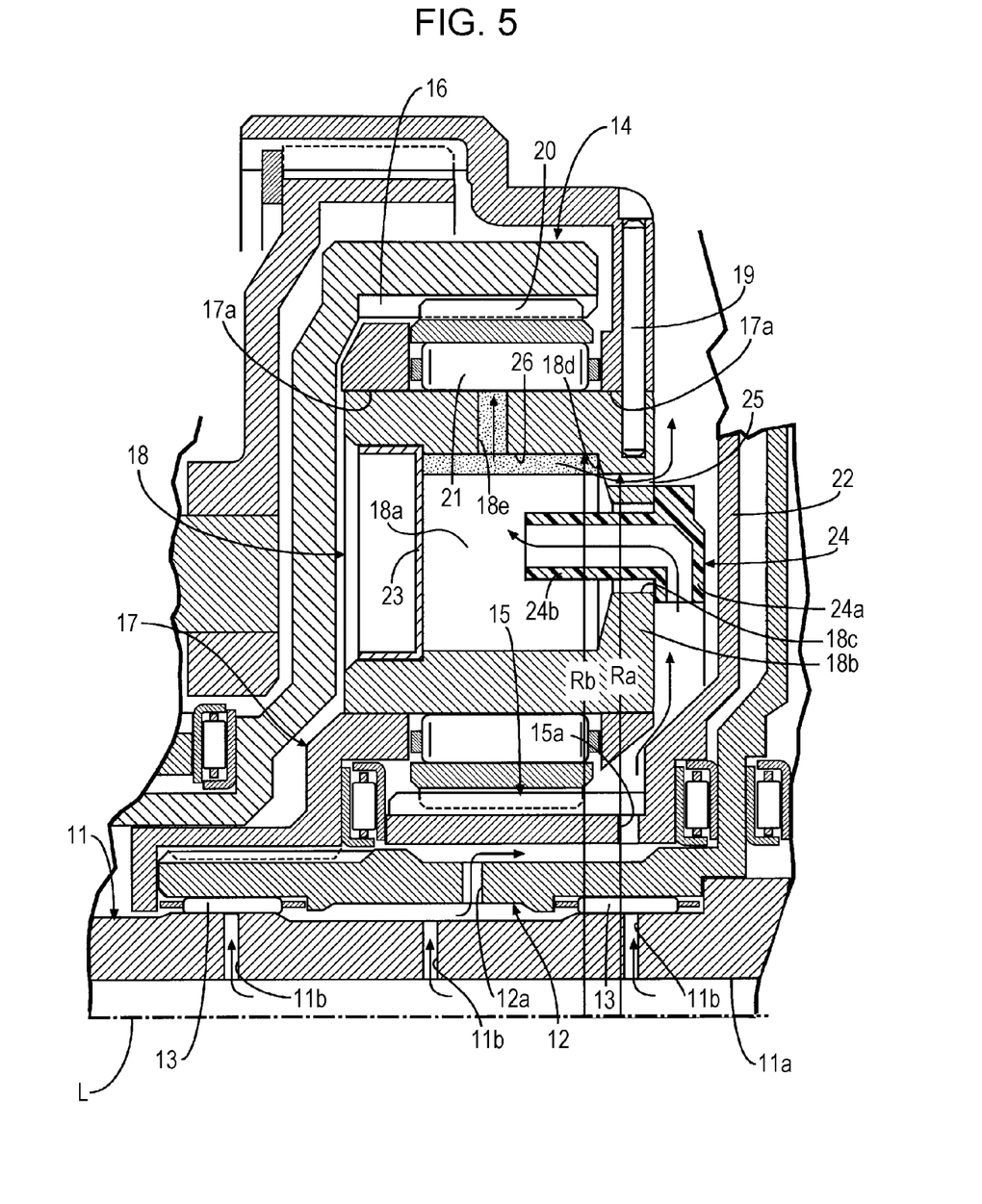
FIG. 5 is a longitudinal sectional view of a planetary gear mechanism according to a third embodiment.

Next, referring to FIG. 5, a third embodiment of the present disclosure will be described.

In the third embodiment, which is a modification of the first embodiment, the diameter of the opening 18c of the end wall of 18b of the pinion shaft 18 is smaller than that of the first embodiment. As seen from the axis L of the input shaft 11, a through-hole 18f extends in the direction of the axis L through an end wall of 18b that is located further outward than the outer end of the opening 18c in the radial direction. The through-hole 18f forms the aperture 25. In the hollow portion 18a, the oil reservoir 26 is defined by the stepped portion 18d, which is located between an outer end of the through-hole 18f in the radial direction and an outer end of the hollow portion 18a in the radial direction.

In addition to the advantage of the first embodiment, the third embodiment has an advantage that the dimensions and the position of the aperture 25 can be flexibly set.

The embodiments described above can be modified in various ways within the spirit and scope of the present disclosure.

For example, in the embodiments, both of the oil catcher 24 and the aperture 25 are disposed at one end of the pinion shaft 18 in the direction of the axis L. Alternatively, the oil catcher 24 may be disposed at one end in the direction of the axis L, and the aperture 25 may be disposed at the other end in the direction of the axis L. Further alternatively, the oil catcher 24 may be disposed at one end in the direction of the axis L, and the apertures 25 may be disposed at both ends in the direction of the axis L. Further alternatively, the oil catchers 24 may be disposed at both ends in the direction of the axis L, and the aperture 25 may be disposed at one end in the direction of the axis L.

The number of the pinion shafts 18 of the planetary gear mechanism 14 is not limited to four.

In the embodiments, the planetary gear mechanism 14 is a single-pinion planetary gear mechanism. However, the present disclosure is also applicable to a double-pinion planetary gear mechanism.

According to an aspect of an embodiment of the present disclosure, provided is a pinion lubrication structure of a planetary gear mechanism that includes a pinion, a pinion shaft that rotatably supports the pinion, and a carrier that rotates around an axis. The pinion lubrication structure includes a hollow portion formed in the pinion shaft; an annular oil catcher supported by the carrier, the oil catcher catching oil and guiding the oil into the hollow portion, the oil being supplied outward in a radial direction from a central portion of the planetary gear mechanism in the radial direction; and an oil gallery through which the oil is supplied to an inner peripheral surface of the pinion, the oil gallery extending from an inside of the hollow portion through the pinion shaft in the radial direction. An aperture that is connected to the hollow portion is formed at an axial end of the pinion shaft, and a distance from the axis to an outer end of the aperture in the radial direction is smaller than a distance from the axis to an outer end of the hollow portion in the radial direction.

With this structure, an oil reservoir, which holds oil that is urged outward in the radial direction by a centrifugal force, is formed at a position in the hollow portion of the pinion shaft that is far from the axis. Therefore, the pinion can be reliably lubricated by holding a minimum necessary amount of oil in the oil reservoir. Moreover, because surplus oil can be discharged from the oil reservoir to the outside through the aperture, the oil catcher and the like are prevented from being removed due to a centrifugal force acting on an excessively large amount of oil in the hollow portion and becoming damaged.

In the pinion lubrication structure, the oil catcher may includes a tubular oil guide portion that is inserted into an opening formed at an axial end of the pinion shaft, and the aperture may be formed between an inner periphery of the opening and an outer periphery of the oil guide portion.

With this structure, the aperture can be automatically formed by only inserting the oil guide portion of the oil catcher into the opening of the pinion shaft.

In the pinion lubrication structure in which the oil catcher includes the tubular oil guide portion, a protrusion may be formed on an outer peripheral portion of the oil catcher, the protrusion covering a part of the aperture.

With this structure, the opening area of the aperture can be easily adjusted by only changing the dimensions of the protrusion.

The pinion lubrication structure may further include a plug that is pressed into the hollow portion from an axial end of the pinion shaft; the oil catcher may include a tubular oil guide portion that is inserted from an axial end of the pinion shaft into an opening formed at a center of the plug; and the aperture may be formed between an inner periphery of the opening and an outer periphery of the oil guide portion.

With this structure, the aperture can be automatically formed by only inserting the oil guide portion of the oil catcher into the opening of the plug.

In the pinion lubrication structure, the oil catcher may include a tubular oil guide portion that is inserted into an opening formed at an axial end of the pinion shaft, and the aperture may be formed of a through-hole extending through an end wall of the pinion shaft in which the opening is formed.

With this structure, the dimensions and the position of the aperture can be freely set.

Obviously, numerous modifications and variations of the present invention are possible in light of the above teachings. It is therefore to be understood that within the scope of the appended claims, the invention may be practiced otherwise than as specifically described herein.

What is claimed is:

1. A pinion lubrication structure of a planetary gear mechanism that includes a pinion, a pinion shaft that rotatably supports the pinion, and a carrier that rotates around an axis, the pinion lubrication structure comprising:
   a hollow portion provided in the pinion shaft;
   an annular oil catcher supported by the carrier to collect oil so that the oil flows into the hollow portion, the oil being supplied outward in a radial direction from a central portion of the planetary gear mechanism;
   an oil gallery through which the oil is supplied to an inner peripheral surface of the pinion, the oil gallery extending from an inside of the hollow portion through the pinion shaft in the radial direction; and
   an aperture provided at an axial end of the pinion shaft to be connected to the hollow portion, a distance from the axis to an outer end of the aperture in the radial direction being smaller than a distance from the axis to an outer end of the hollow portion in the radial direction,
   wherein the annular oil catcher includes a tubular oil guide portion that is inserted into an opening provided at an axial end of the pinion shaft, and
   wherein the aperture is provided between an inner periphery of the opening and an outer periphery of the tubular oil guide portion.

2. The pinion lubrication structure according to claim 1, wherein a protrusion is provided on an outer peripheral portion of the annular oil catcher, the protrusion covering a part of the aperture.

3. The pinion lubrication structure according to claim 2, wherein the pinion shaft includes an opening at an axial end of the pinion shaft, wherein the hollow portion and the opening each have a circular shape when viewed on a cross-section taken along a plane perpendicular to an axial direction along the axis, wherein a diameter of the hollow portion is larger than a diameter of the opening, wherein a stepped portion is provided between an inner periphery of the hollow portion and an inner periphery of the opening, and wherein an oil reservoir to hold the oil is provided between the inner periphery of the hollow portion and the stepped portion.

4. The pinion lubrication structure according to claim 2, wherein the tubular oil guide portion extends through the opening and is inserted into the hollow portion, wherein the annular oil catcher includes an oil catching portion outside the hollow portion to collect the oil, and wherein the oil catching portion is open inward in the radial direction.

5. The pinion lubrication structure according to claim 1, further comprising:

a plug that is pressed into the hollow portion from an axial end of the pinion shaft, wherein the annular oil catcher includes a tubular oil guide portion that is inserted from an axial end of the pinion shaft into an opening provided at a center of the plug, and wherein the aperture is provided between an inner periphery of the opening and an outer periphery of the tubular oil guide portion.

6. The pinion lubrication structure according to claim 5, wherein the pinion shaft includes an opening at an axial end of the pinion shaft, wherein the hollow portion and the opening each have a circular shape when viewed on a cross-section taken along a plane perpendicular to an axial direction along the axis, wherein a diameter of the hollow portion is larger than a diameter of the opening, wherein a stepped portion is provided between an inner periphery of the hollow portion and an inner periphery of the opening, and wherein an oil reservoir to hold the oil is provided between the inner periphery of the hollow portion and the stepped portion.

7. The pinion lubrication structure according to claim 5, wherein the tubular oil guide portion extends through the opening and is inserted into the hollow portion, wherein the annular oil catcher includes an oil catching portion outside the hollow portion to collect the oil, and wherein the oil catching portion is open inward in the radial direction.

8. The pinion lubrication structure according to claim 1, wherein the pinion shaft includes an opening at an axial end of the pinion shaft, wherein the hollow portion and the opening each have a circular shape when viewed on a cross-section taken along a plane perpendicular to an axial direction along the axis, wherein a diameter of the hollow portion is larger than a diameter of the opening, wherein a stepped portion is provided between an inner periphery of the hollow portion and an inner periphery of the opening, and wherein an oil reservoir to hold the oil is provided between the inner periphery of the hollow portion and the stepped portion.

9. The pinion lubrication structure according to claim 1, wherein the tubular oil guide portion extends through the opening and is inserted into the hollow portion, wherein the annular oil catcher includes an oil catching portion outside the hollow portion to collect the oil, and wherein the oil catching portion is open inward in the radial direction.

10. The pinion lubrication structure according to claim 1, wherein the aperture is an open passageway that extends from the hollow portion to an outside of the pinion shaft.

11. A pinion lubrication structure of a planetary gear mechanism that includes a pinion, a pinion shaft that rotatably supports the pinion, and a carrier that rotates around an axis, the pinion lubrication structure comprising:

a hollow portion provided in the pinion shaft;

an annular oil catcher supported by the carrier to collect oil so that the oil flows into the hollow portion, the oil being supplied outward in a radial direction from a central portion of the planetary gear mechanism;

an oil gallery through which the oil is supplied to an inner peripheral surface of the pinion, the oil gallery extending from an inside of the hollow portion through the pinion shaft in the radial direction; and an aperture provided at an axial end of the pinion shaft to be connected to the hollow portion, a distance from the axis to an outer end of the aperture in the radial direction being smaller than a distance from the axis to an outer end of the hollow portion in the radial direction, wherein the annular oil catcher includes a tubular oil guide portion that is inserted into an opening provided at an axial end of the pinion shaft, and wherein the aperture is provided by a through-hole extending through an end wall of the pinion shaft in which the opening is provided.

12. The pinion lubrication structure according to claim 11, wherein the pinion shaft includes an opening at an axial end of the pinion shaft, wherein the hollow portion and the opening each have a circular shape when viewed on a cross-section taken along a plane perpendicular to an axial direction along the axis, wherein a diameter of the hollow portion is larger than a diameter of the opening, wherein a stepped portion is provided between an inner periphery of the hollow portion and an inner periphery of the opening, and wherein an oil reservoir to hold the oil is provided between the inner periphery of the hollow portion and the stepped portion.

13. The pinion lubrication structure according to claim 11, wherein the tubular oil guide portion extends through the opening and is inserted into the hollow portion, wherein the annular oil catcher includes an oil catching portion outside the hollow portion to collect the oil, and wherein the oil catching portion is open inward in the radial direction.

14. A pinion lubrication structure of a planetary gear mechanism that includes a pinion, a pinion shaft that rotatably supports the pinion, and a carrier that rotates around an axis, the pinion lubrication structure comprising:

a hollow portion provided in the pinion shaft;

an annular oil catcher supported by the carrier to collect oil so that the oil flows into the hollow portion, the oil being supplied outward in a radial direction from a central portion of the planetary gear mechanism;

an oil gallery through which the oil is supplied to an inner peripheral surface of the pinion, the oil gallery extending from an inside of the hollow portion through the pinion shaft in the radial direction; and an aperture provided at an axial end of the pinion shaft to be connected to the hollow portion, a distance from the axis to an outer end of the aperture in the radial direction being smaller than a distance from the axis to an outer end of the hollow portion in the radial direction, wherein the annular oil catcher includes a tubular oil guide portion that is inserted into an opening provided at an axial end of the pinion shaft, and wherein the aperture which connects the hollow portion in the pinion shaft and an outside of the pinion shaft is located more outward than the tubular oil guide portion in the radial direction.

15. The pinion lubrication structure according to claim 14, wherein the aperture is provided between an inner periphery of the opening and an outer periphery of the tubular oil guide portion.

16. The pinion lubrication structure according to claim 14, wherein a protrusion is provided on an outer peripheral portion of the annular oil catcher, the protrusion covering a part of the aperture.

17. The pinion lubrication structure according to claim 14, further comprising:

a plug that is pressed into the hollow portion from an axial end of the pinion shaft, wherein the aperture is provided between an inner periphery of the opening and an outer periphery of the tubular oil guide portion.

18. The pinion lubrication structure according to claim 14, wherein the aperture is provided by a through-hole extending through an end wall of the pinion shaft in which the opening is provided.

19. The pinion lubrication structure according to claim 14, wherein the pinion shaft includes an opening at an axial end of the pinion shaft, wherein the hollow portion and the opening each have a circular shape when viewed on a cross-section taken along a plane perpendicular to an axial direction along the axis, wherein a diameter of the hollow portion is larger than a diameter of the opening, wherein a stepped portion is provided between an inner periphery of the hollow portion and an inner periphery of the opening, and wherein an oil reservoir to hold the oil is provided between the inner periphery of the hollow portion and the stepped portion.

20. The pinion lubrication structure according to claim 14, wherein the tubular oil guide portion extends through the opening and is inserted into the hollow portion, wherein the annular oil catcher includes an oil catching portion outside the hollow portion to collect the oil, and wherein the oil catching portion is open inward in the radial direction.

* * * * *